(12) United States Patent
Saito et al.

(10) Patent No.: US 7,506,378 B2
(45) Date of Patent: Mar. 17, 2009

(54) DATA RECORDING MEDIUM, PROGRAM STARTING METHOD, AND PROGRAM

(75) Inventors: Akiya Saito, Kanagawa (JP); Yoriaki Kanada, Kanagawa (JP); Etsuo Shibasaki, Tokyo (JP); Shunsuke Furukawa, Tokyo (JP); Koichi Nakajima, Chiba (JP); Yoichiro Sako, Tokyo (JP); Akiko Inoue, Saitama (JP); Kaoru Kijima, Tokyo (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 10/614,036

(22) Filed: Jul. 8, 2003

(65) Prior Publication Data
US 2004/0056090 A1    Mar. 25, 2004

(30) Foreign Application Priority Data
Jul. 9, 2002    (JP) ............................ 2002-199794

(51) Int. Cl.
*H04L 9/00* (2006.01)
*G06F 7/64* (2006.01)
*G06F 9/44* (2006.01)
*G06F 9/445* (2006.01)
*G11B 5/09* (2006.01)
*G11B 15/52* (2006.01)

(52) U.S. Cl. .......................... 726/26; 726/27; 713/182; 705/56; 705/57; 717/115; 717/175; 369/47.1; 369/47.34

(58) Field of Classification Search ................. 713/200, 713/182; 717/115, 175; 705/56
See application file for complete search history.

(56) References Cited

U.S. PATENT DOCUMENTS

| 5,711,672 | A  | * | 1/1998 | Redford et al. ......... 434/307 R |
| 5,727,205 | A  | * | 3/1998 | Bell et al. .................. 707/200 |
| 6,721,879 | B1 | * | 4/2004 | Tanaka .......................... 713/1 |
| 6,725,205 | B1 | * | 4/2004 | Weiler et al. ................. 705/57 |
| 6,865,550 | B1 | * | 3/2005 | Cok ............................. 705/51 |

(Continued)

FOREIGN PATENT DOCUMENTS

JP    5-334072    12/1993

(Continued)

OTHER PUBLICATIONS

"Data Interchange on Read-Only 120 mm optical disks (CD-ROM)," Jun. 1996, Standard ECMA-130, pp. 1-57.*

*Primary Examiner*—Kaveh Abrishamkar
*Assistant Examiner*—Ayaz Sheikh
(74) *Attorney, Agent, or Firm*—Oblon, Spivak, McClelland, Maier & Neustadt, P.C.

(57) ABSTRACT

First, an ID added disc is loaded. A disc ID is read from the disc at step S2. The disc ID matches a hardware ID of hardware that can use software recorded on the disc. If the disc ID has not been read from the disc, an error process is performed. At step S3, a hardware ID of hardware connected to a personal computer is obtained. At step S4, it is determined whether or not both the IDs match. When the determined result represents that they match, at step S5, an application starts. When the determined result at step S4 represents that they do not match, at step S6, an error message is displayed on a display of the personal computer.

12 Claims, 5 Drawing Sheets

U.S. PATENT DOCUMENTS

| | | | |
|---|---|---|---|
| 7,076,536 B2* | 7/2006 | Chiloyan et al. | 709/220 |
| 7,356,702 B2* | 4/2008 | Kanada et al. | 713/182 |
| 2002/0129043 A1* | 9/2002 | Nakada et al. | 707/200 |
| 2002/0144114 A1* | 10/2002 | Barnard et al. | 713/166 |
| 2004/0042363 A1* | 3/2004 | Kobayashi et al. | 369/53.21 |

FOREIGN PATENT DOCUMENTS

| | | |
|---|---|---|
| JP | 8-278879 | 10/1996 |
| JP | 2001-160253 | 6/2001 |

* cited by examiner

DATA RECORDING MEDIUM, PROGRAM STARTING METHOD, AND PROGRAM

BACKGROUND OF THE INVENTION

1. Field of the Invention

The present invention relates to a data recording medium for use with a program such as game software, application software, or the like recorded on for example a read-only memory (ROM) type optical disc, a program starting method, and a program therefor.

2. Description of the Related Art

Programs for example application programs bundled (packaged) with hardware for example personal computers (hereinafter referred to as personal computers) are normally supplied using optical discs such as CD-ROMs that can be produced in quantity.

However, although those application programs are bundled products, they can be used without the corresponding hardware. This is because it is difficult to record essential hardware information that change time by time on CD-ROMs that are produced in quantity. Since each user of a program should be charged therefor, it does not need to restrict a bundled program to a corresponding hardware. In addition, hardware is normally accompanied with a manual that describes its handling. However, to accompany each piece of hardware that is produced on small-quantity many-type basis with a manual raises print cost and inventory cost, which restricts cost reduction of the hardware.

OBJECTS AND SUMMARY OF THE INVENTION

Therefore, an object of the present invention is to provide a data recording medium that allows hardware on which a program runs to be restricted and a manual therefor to be easily provided, a program starting method thereof, and a program therefor.

To solve the foregoing problem, the present invention is a data recording medium on which medium identification information unique to the data recording medium has been recorded, the medium identification information having information with which hardware that can use a program recorded on the data recording medium is recognized, a starting program having been recorded on the data recording medium, the starting program being automatically started corresponding to obtained hardware identification information and the medium identification information.

Another present invention is a data recording medium on which medium identification information unique to the data recording medium has been recorded, a plurality of programs having been recorded on the data recording medium, the medium identification information having information with which one of the plurality of programs is designated, a starting program causing the program designated with the medium identification information to automatically start having been recorded on the data recording medium.

Another present invention is a program starting method for starting a program recorded on a recording medium, comprising the steps of:

obtaining medium identification information unique to the recording medium;

obtaining hardware identification information that represents hardware that can use the program;

comparing the medium identification information and the hardware identification information;

starting the program when the hardware identification information represents hardware that the medium identification information represents; and performing an error process when the hardware identification information does not represent hardware that the medium identification information represents.

Another present invention is a program starting method for starting a program recorded on a recording medium, comprising the steps of:

obtaining the medium identification information;

determining a type that the medium identification information represents;

selectively starting a program corresponding to the type that the medium identification information represents; and performing an error process when the hardware identification information does not represent hardware that the medium identification information represents.

Another present invention is a starting program for causing a computer to execute a program recorded on a recording medium, the starting program comprising the steps of:

obtaining medium identification information unique to the recording medium;

obtaining hardware identification information that represents hardware that can use the program;

comparing the medium identification information and the hardware identification information;

starting the program when the hardware identification information represents hardware that the medium identification information represents; and performing an error process when the hardware identification information does not represent hardware that the medium identification information represents.

Another present invention is a starting program for causing a computer to execute a program recorded on a recording medium, the starting program comprising the steps of:

obtaining the medium identification information;

determining a type that the medium identification information represents;

selectively starting a program corresponding to the type that the medium identification information represents; and performing an error process when the hardware identification information does not represent hardware that the medium identification information represents.

According to the present invention, medium identification information has been recorded on a data recording medium along with a program. With the medium identification information, hardware that can use the program can be restricted. In addition, when a plurality of programs have been recorded on a data recording medium, a program is selectively started corresponding to the medium identification information. Thus, manuals for a plurality of pieces of hardware can be recorded on one medium.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Next, embodiments of the present invention will be described. According to an embodiment of the present invention, medium identification information (hereinafter referred to as disc ID) has been recorded on an optical disc for example a CD-ROM along with for example application software. The disc ID is information with which an individual disc is identified. As a disc ID, a numeral, a symbol, a letter, and so forth can be used. In addition, a disc ID uniquely identifies a plurality of CD-ROMs on which application software has been recorded. A disc ID is recorded so that it can be read by a conventional CD-ROM drive. Next, for easy understanding of an embodiment of the present invention, the structure of an optical disc for example a CD-ROM will be described.

Figure 1:
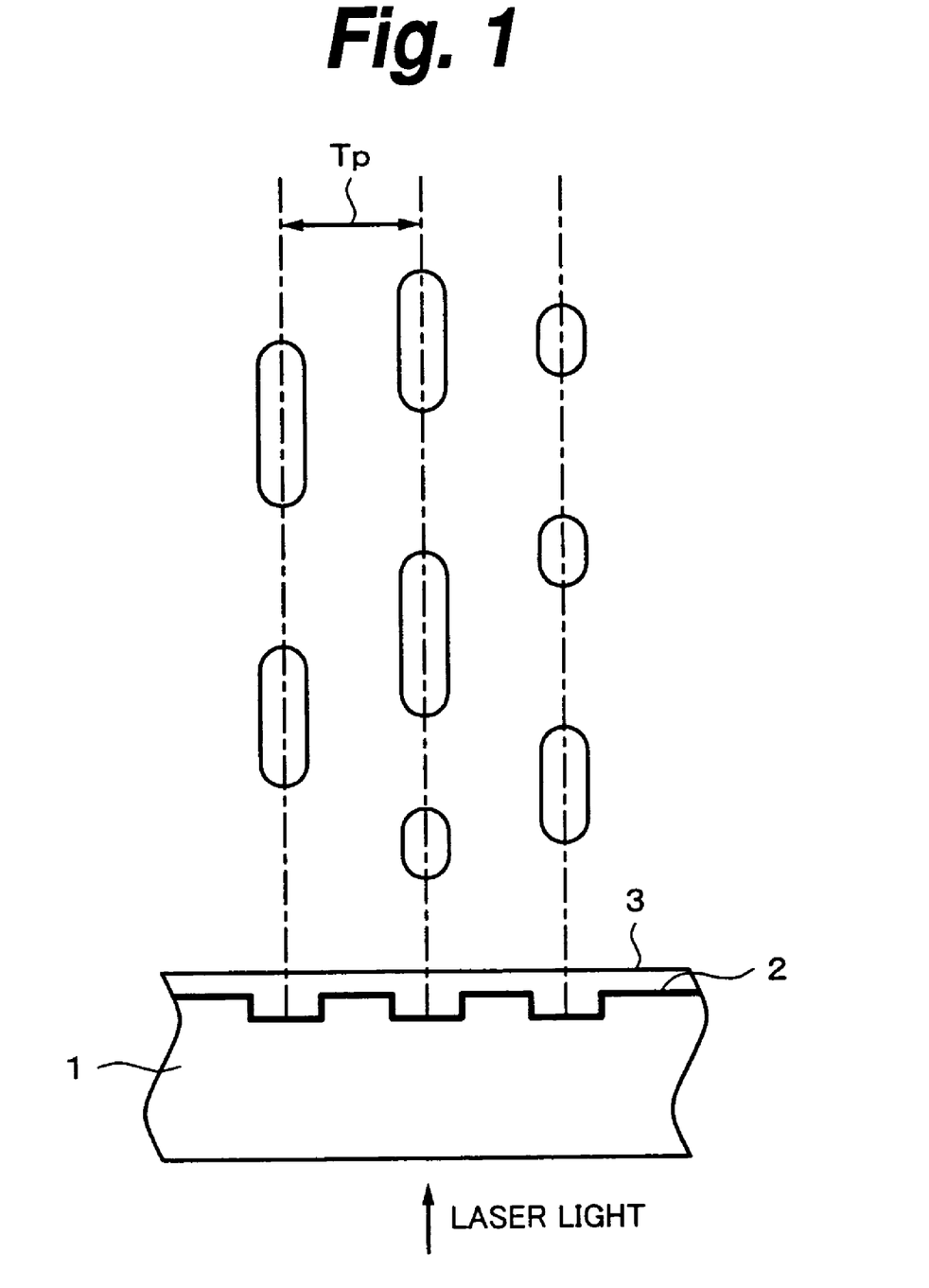
FIG. 1 is a schematic diagram describing a recording pattern and a structure of a conventional CD.

FIG. 1 is an enlarged view showing a conventional CD-ROM. On tracks having a predetermined track pitch Tp (for example, 1.6 μm), concave portions called pits and lands that are non-pit portions are alternately formed. The length of each of pits or lands is defined in the range from 3T to 11T, where T represents the minimum time interval. Laser light is radiated from the bottom of a CD-ROM.

A CD-ROM is composed of a transparent disc substrate 1 having a thickness of 1.2 mm, a reflection film 2 coated thereon, and a protection film 3 coated thereon that are successively formed from the bottom that is exposed to laser light. The reflection film 2 has a high reflectance. Although a CD-ROM is a read-only disc, as will be described later, after the reflection film 2 is coated, medium identification information (disc ID) is recorded on the reflection film 2 with high output laser light.

Next, with reference to FIG. 2, a flow of a producing process of such a CD-ROM will be described. At step S1, a glass master disc in which photoresist as photosensitive material has been coated on a glass substrate is rotated by a spindle motor. Laser light that is turned on and off corresponding to a record signal is radiated to a photoresist film. As a result, a master is produced. A developing process is performed for the photoresist film. When positive resist is used, an exposed portion melts. As a result, an uneven pattern is formed on the photoresist film.

An electric plating process is performed for the photoresist master disc. As a result, one metal master is produced (at step S2). From the metal master, a plurality of mothers are produced (at step S3). In addition, from each mother, a plurality of stampers are produced (at step S4). From a stamper, a disc substrate is produced. To produce a disc substrate, the compression molding method, injection molding method, light setting method, and so forth are known. At step S6, a reflection film and a protection film are coated on the disc substrate. In the conventional disc producing method, a label is printed on a CD-ROM. As a result, a final CD-ROM product is produced.

Figure 2:
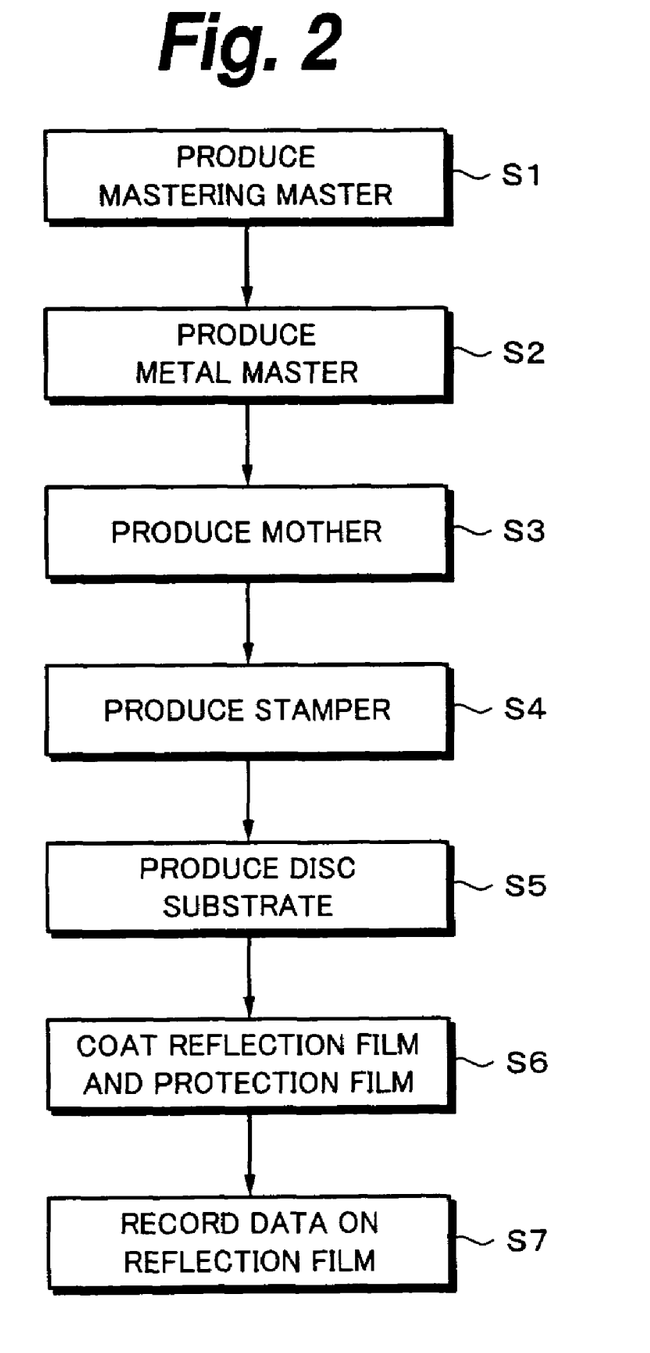
FIG. 2 is a schematic diagram describing a disc producing process according to an embodiment of the present invention.

On the other hand, in the example shown in FIG. 2, a step for radiating high output laser light to a reflection film (a mirror portion, for example a land) and postscript recording information to the land is added as step S7. On the land of the reflection film, by a thermal process (thermal recording) for radiating which laser light, atoms travel and the film structure and crystal structure vary. As a result, the reflectance of the position lowers. Thus, after laser light has been radiated on the land, since the amount of reflected laser light decreases, the reading apparatus recognizes it as pits. Using this physical characteristic, the pit length or land length is varied. As a result, information can be recorded. In this case, as a reflection film, a material whose reflectance is varied by laser radiation is used. Not only a material whose reflectance is lowered by laser radiation, but a material whose reflectance is raised by laser radiation may be used.

In reality, a reflection film is made of an aluminum alloy film $Al_{100-y}X_y$, where X is at least one element selected from the group consisting of Ge, Ti, Ni, Si, Tb, Fe, and Ag. The composition ratio of y in the Al alloy film is selected so that the relation of $5<y<50$ [atomic %] is satisfied.

In addition, a reflection film may be made of $Ag_{100-z}Y_z$, where Y is at least one element selected from the group consisting of Ge, Ti, Ni, Si, Tb, Fe, and Al. The composition ratio Z in the Al alloy film is selected so the relation of $5<z<50$ [atomic %] is satisfied. A reflection film is formed by for example the magnetron spattering method.

As an example, a reflection film made of AlGe alloy is formed with a thickness of 50 nm. When laser light is radiated from the transparent substrate or protection film side to the reflection film through an objective lens, if the composition ratio of Ge is 20 [atomic %] and the recording power is in the range from 6 to 7 [mW], the reflection rate lowers by around 6%. At that point, if the composition ratio of Ge is 27.6 [atomic %] and the recording power is in the range from 5 to 8 [mW], the reflection ratio lowers by around 7 to 8%. When the reflection ratio varies, postscript recording can be performed for the reflection film.

Figure 3:
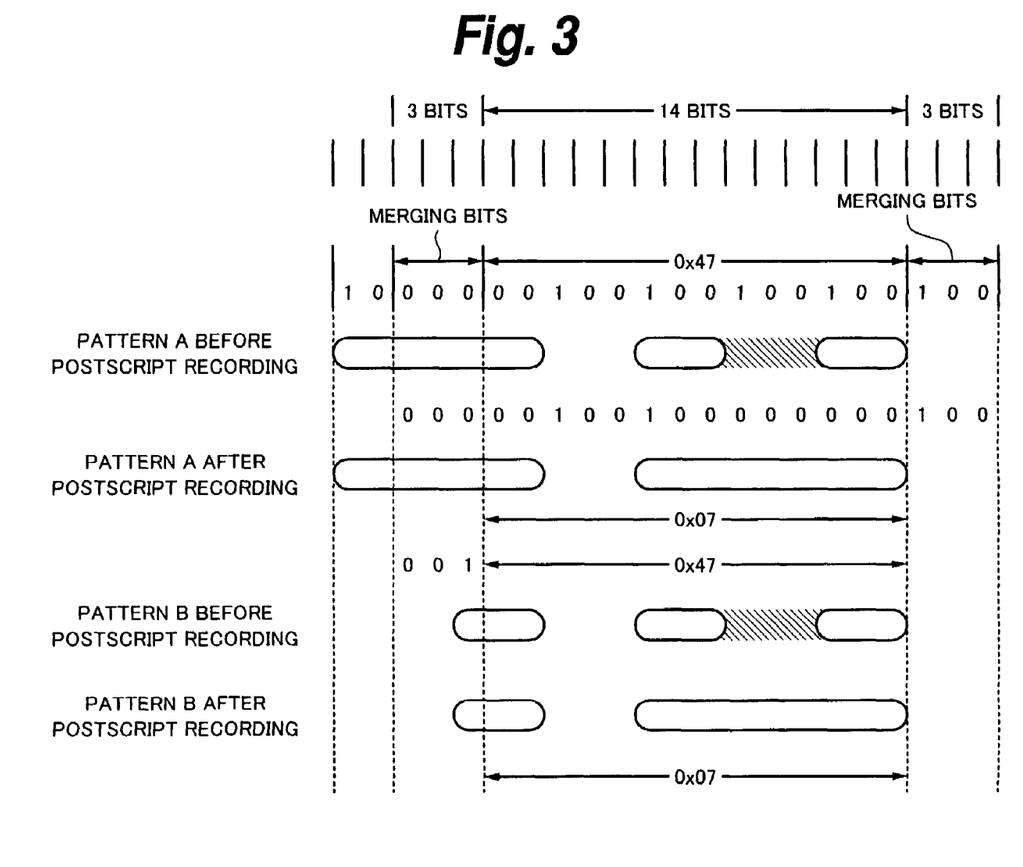
FIG. 3 is a schematic diagram describing a postscript recording according to an embodiment of the present invention.

FIG. 3 is a schematic diagram describing a method for postscript recording a disc ID. There would be pattern A and pattern B as relations between record data and pits/lands.

First of all, pattern A will be described. For example, merging bits (000) of three bits are inserted between symbols. When data is postscript recorded, a data symbol of eight bits is for example (0x47), where 0x represents hexadecimal notation. A pattern of 14 bits (00100100100100) of which the eight bits has been EFM modulated is shown in FIG. 3.

A laser beam for postscript recording is radiated to a hatched area between two pits. As a result, the reflectance of the hatched area lowers. After postscript recording is performed, the two pits are reproduced as one combined pit. In this case, the pattern of 14 bits becomes (00100100000000). When the pattern (00100100000000) is EFM demodulated, eight bits (0x07) is obtained.

In the case of pattern B, merging bits is (001). Like pattern A, when a laser beam is radiated to a hatched area, eight bits can be changed from (0x47) to (0x07).

As described above, a data symbol of (0x47) can be rewritten to (0x07). Besides those examples, there are many types of data that can be postscript recorded. For example, a data symbol of (0x40) can be changed to (0x00). However, in the postscript recording, laser is radiated to a mirror portion on which data has been recorded so as to change the pit length or land length. Thus, types of data that can be postscript recorded are restricted.

FIG. 3 shows an example of postscript recording. There are various methods for recording a disc ID for example a method for intentionally causing an EFM error in a predetermined region and postscript recording a disc ID depending on whether or not there is an EFM error and a method for intentionally postscript recording an error that cannot be corrected with an error correction code. Since a disc ID recorded on a disc in such a manner is not formed as a pit on the disc substrate, when an illegally disc is produced from the disc substrate as a master disc, the disc ID is not copied to the illegal disc. In addition, when data is postscript recorded, since the disc ID is encoded, it is not easy to know the disc ID. Thus, normally, the disc ID can be prevented from being illegally read. Even if the disc ID is illegally read, it is information about the disc. Thus, it is not valid for disc IDs for other discs. As a result, the damage of which a disc ID is read is slight.

As described above, the present invention uses a disc such as a CD-ROM on which a disc ID that identifies the disc has been recorded. Next, with reference to FIG. 4, an embodiment of the present invention will be described. In the following description, the foregoing disc is sometimes referred to as ID added disc.

Figure 4:
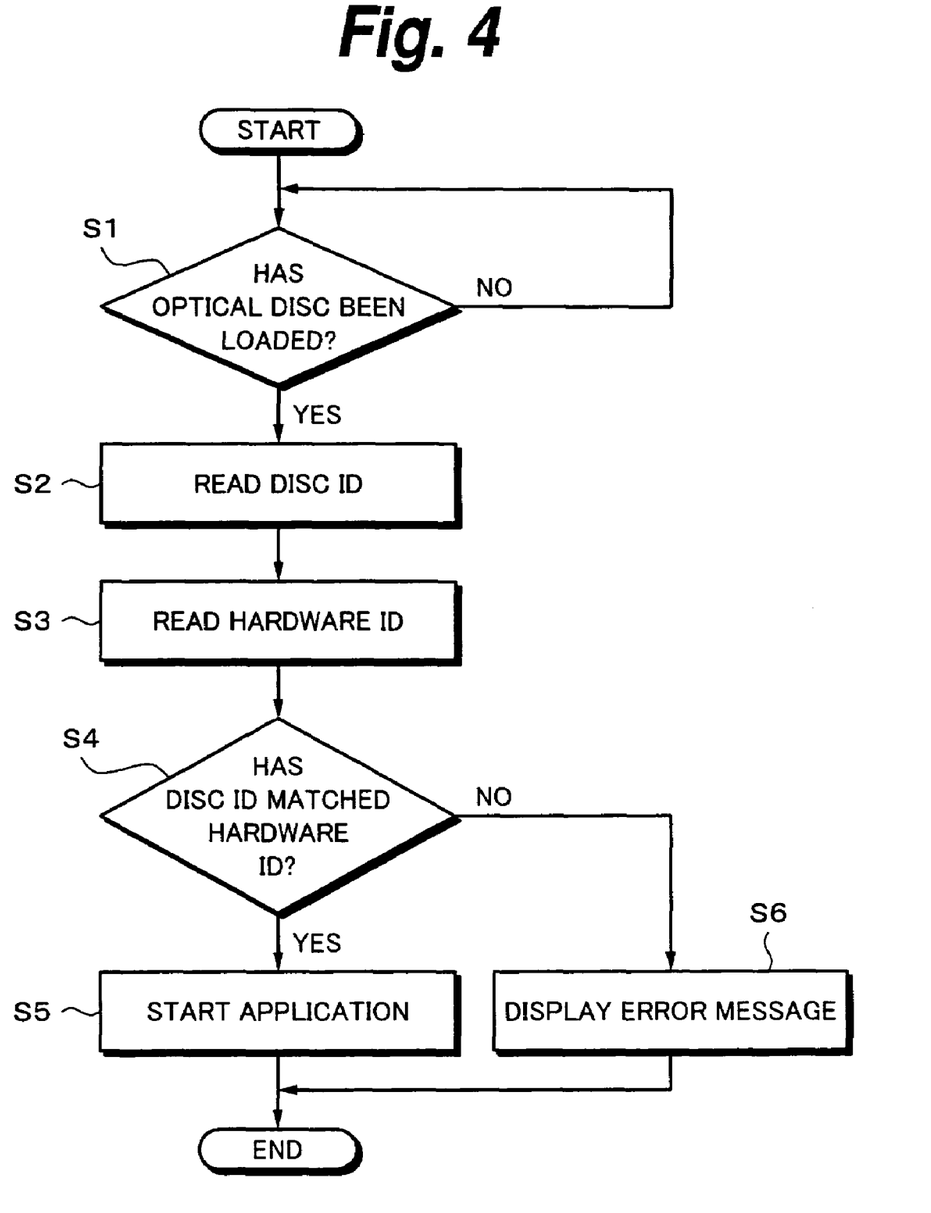
FIG. 4 is a flow chart showing a flow of a process of a starting program according to an embodiment of the present invention.

FIG. 4 is a flow chart showing a flow of a process according to an embodiment of the present invention. A starting program that performs the process shown in the flow chart has been recorded on an ID added disc bundled with hardware along with drive software necessary for operating hardware and application software such as drive software that uses the hardware. The hardware represents devices such as a CD-R drive, a scanner, and a printer connected to a personal computer. Each piece of hardware has unique identification information (referred to as hardware ID). A hardware ID is an identification number unique to each hardware device. A disc ID has information that recognizes hardware on which application software recorded on the disc runs, namely the information that accords with a hardware ID of the hardware. A maker not a device may be recognized as a hardware ID.

First, an ID added disc is loaded into the drive of the personal computer (at step S1). At step S2, the disc ID is read from the disc. After the disc ID has been read, the starting program shown in the flow chart of FIG. 4 automatically starts. If the disc ID has not been read from the disc, an error process is performed. At step S3, a hardware ID of hardware connected to the personal computer through an interface such as the USB is obtained. The hardware ID is obtained using a function of the personal computer.

At step S4, it is determined whether or not the disc ID matches the hardware ID. When the determined result at step S4 represents that they match, at step S5, the application starts. For example, an installer that installs the application software to the personal computer starts. If the determined result at step S4 represents that the disc ID does not match the hardware ID, at step S6, an error message is displayed on the display of the personal computer. In this case, for example, a message that reads "Connect hardware." is displayed.

Although optical discs on which the same application software has been recorded are produced in quantity in the conventional manner, disc IDs corresponds to individual pieces of hardware. Thus, application software recorded on an ID added disc can be used only for hardware identified by a disc ID as if optical discs dedicated for individual pieces of hardware were produced. Thus, application software bundled with hardware can be used only for the hardware. As a result, the application software can be prevented from being used regardless of the hardware.

Figure 5:
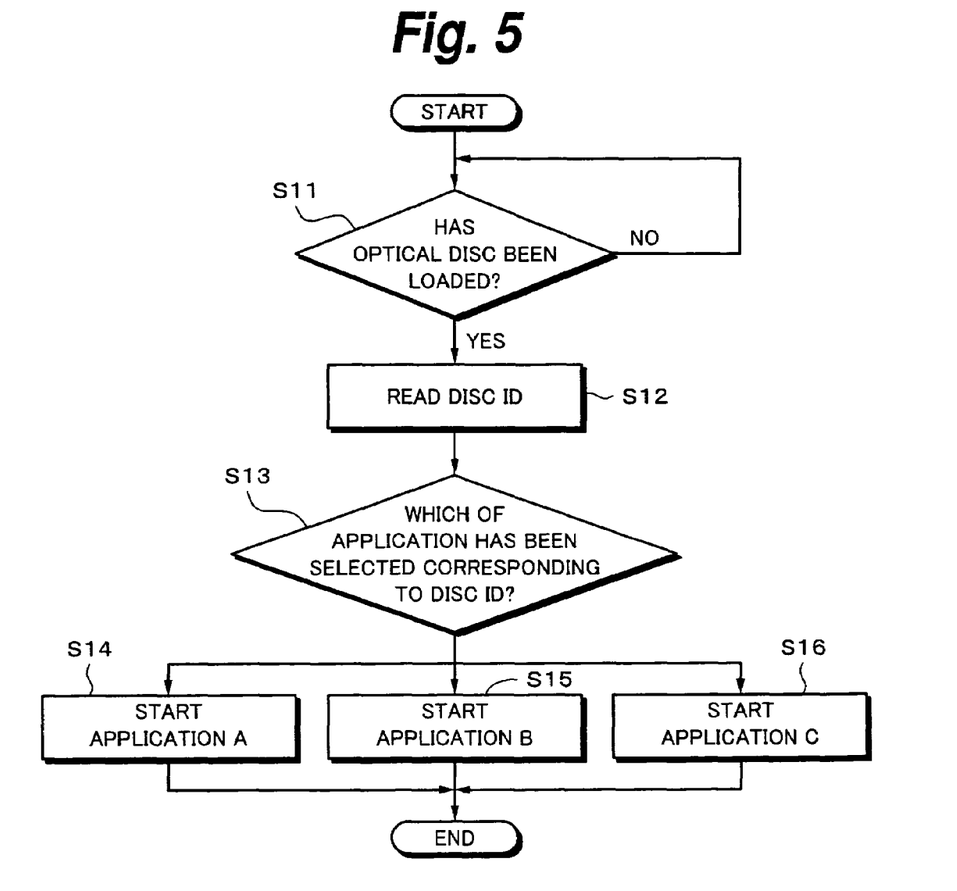
FIG. 5 is a flow chart showing a flow of a process of a starting program according to another embodiment of the present invention.

FIG. 5 is a flow chart showing a flow of a process according to another embodiment of the present invention. A program that performs the process shown in the flow chart has been recorded on an ID added disc along with a plurality of pieces of application software for hardware. Hardware is not limited to a scanner, a printer, and so forth connected to the personal computer. Application software is for example a manual that describes how to handle hardware.

According to the present embodiment, applications A, B, and C for three types of pieces of hardware have been recorded on a disc. A disc ID has a function for designating one of these applications and may correspond to these three applications. Alternatively, a set of a plurality of disc IDs may correspond to types of applications.

First of all, an ID added disc is loaded into the drive of the personal computer (at step S11). At step S12, the disc ID is read from the disc. After the disc ID has been read, a starting program shown in the flow chart of FIG. 5 automatically starts. If the disc ID has not been read from the disc, an error process is performed.

At step S13, an application to be started is selected corresponding to the disc ID. At step S14, a process for starting the application A is performed. At step S15, a process for starting the application B is performed. At step S16, a process for starting the application C is performed. When an application is a manual, after the application has started, the manual thereof can be browsed on the personal computer. Alternatively, the manual is installed to the personal computer. If the disc ID does not represent the type of an application, an error process is performed for example an error message is displayed.

According to another embodiment of the present invention, a plurality of pieces of application software have been recorded on an ID added disc. A disc ID designates an application software to be started. Thus, when application software is for example a manual, a plurality of hardware manuals have been recorded on one disc. With a disc ID, a manual to be started can be designated. When a disc having a disc ID corresponding to hardware has been bundled thereto, a manual for the hardware can be started. Of course, the present embodiment can be applied to application software such as drive software other than a manual.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, besides the reflection film, the present invention can be applied to postscript recording for a phase change film, a magneto-optical recording film, and so forth so as to record a disc ID. In addition, the present invention can be applied to a DVD video, a DVD-ROM, and so forth.

As is clear from the foregoing description, according to the present invention, disc identification information having hardware recognition information can be recorded to each of optical discs that are produced in quantity. In other words, program portions can be produced in quantity. In addition, since disc identification information is recorded at low cost, programs that restrict applicable hardware can be distributed. In addition, according to the present invention, optical discs on which manuals and so forth for many types of hardware are electronically recorded can be produced in quantity. Only a manual corresponding to hardware can be read from each disc. As a result, labor and cost necessary for printing, storage, and inventory-control for manuals can be remarkably reduced.

What is claimed is:

1. A data recording medium for use with a recording/reproducing apparatus, comprising:
 a medium identification information unique to the data recording medium recorded thereon;
 a plurality of programs recorded on the data recording medium, wherein the medium identification information includes information with which a designated program of the plurality of programs is designated and a non-designated program of the plurality of programs is not designated; and a starting program, recorded on the data recording medium, configured to cause the designated program of the plurality of programs, designated by the medium identification information, to automatically execute, wherein, the designated program is automatically executed by the recording/reproducing apparatus in response to the medium identification information being detected on the data recording medium, and wherein, the non-designated program, which is not designated in response to the medium identification information, is prevented from being executed by the recording/reproducing apparatus.

2. The data recording medium as set forth in claim 1, wherein the data recording medium is bundled with a hardware device.

3. The data recording medium according to claim 1, wherein said starting program is further configured to verify the medium identification information and a presence of a hardware device.

4. The data recording medium according to claim 1, wherein at least one of the plurality of programs is a user manual.

5. The data recording medium according to claim 2, wherein at least one of the plurality of programs is application software for use with the hardware device.

6. The data recording medium according to claim 1, wherein the medium identification information includes hardware recognition information.

7. The data recording medium according to claim 6, wherein one of the plurality of programs is started based on at least one of a presence or recognition of a hardware device.

8. The data recording medium according to claim 1, wherein the medium identification information includes a plurality of disc identification numbers and each of the plurality of disc identification numbers corresponds to one of the plurality of programs recorded on the data recording medium.

9. A program starting method for executing a program from a plurality of programs recorded on a recording medium, comprising:

obtaining medium identification information;

determining a type that the medium identification information represents;

selectively executing a designated program from the plurality of programs corresponding to the type that the medium identification information represents, the execution being actuated by a starting program recorded on the recording medium;

preventing the executing of a non-designated program from the plurality of programs that does not correspond to the type that the medium identification information represents; and performing an error process when a hardware identification information does not represent hardware that the medium identification information represents, wherein the designated program is automatically executed in response to a recording/reproducing apparatus detecting the medium identification information on the recording medium.

10. The program starting method according to claim 9, wherein the medium identification information includes hardware recognition information.

11. The program starting method according to claim 10, wherein said selectively executing includes a starting of one of the plurality of programs based on at least one of a presence or recognition of a hardware device.

12. The program starting method according to claim 9, wherein the medium identification information includes a plurality of disc identification numbers and each of the plurality of disc identification numbers corresponds to one of the plurality of programs recorded on the recording medium.

* * * * *